INVENTORS
Oskar Machnig &
Walter Stürmer

United States Patent Office 3,321,376
Patented May 23, 1967

3,321,376
HIGH TEMPERATURE NUCLEAR REACTOR
Oskar Machnig and Walter Stürmer, Mannheim, Germany, assignors to Brown Boveri/Krupp Reaktorbau G.m.b.H., Dusseldorf, Germany
Filed Apr. 29, 1965, Ser. No. 451,949
Claims priority, application Germany, Apr. 28, 1964, B 76,547
18 Claims. (Cl. 176—59)

The present invention relates to a high temperature nuclear reactor into which the fuel is introduced in the form of a loosely packed column of particulate and preferably nearly spherical fuel elements, and in which the coolant gas is conducted through the loosely packed column of fuel elements and then gives up its heat in heat exchangers.

In a known type of high temperature nuclear reactor the fuel elements are substantially in the form of a loose bulk of spherical particles. Such nuclear reactors are often referred to as "pelletized fuel reactors." These pelletized fuel reactors contain the spherical fuel particles in a cylindrical center chamber. A gaseous heat transfer medium flows through this cylindrical central chamber contrary to the direction of gravity and carries the heat generated by the fuel elements to one or more heat exchangers which are incorporated in the flow path. These heat exchangers are partly or wholly contained in a common vessel together with the nuclear reactor. The design of such a pelletized fuel reactor for large outputs meets with a number of technological difficulties. An increase in power density, which is desirable, cannot be directly achieved. The maximum possible power density is determined by the nature of the fuel and by the structure of the fuel elements employed. Since fuel elements hitherto known are already utilized to the limits of their capacity, it would be necessary to develop new forms of fuel elements for reactors designed along the lines of hitherto conventional ideas. If an attempt were made to raise the power output by enlarging the fuel chamber (which will hereinafter be referred to as the "core" in conformity with the terminology used in this art) without increasing its wall thickness, the permissible pressure of the gaseous heat transfer medium would have to be proportionately decreased. On the other hand, any increase in wall thickness involves major difficulties in production and assembly, as well as machining and error control, and thus introduces an uncertainty factor. However, if the pressure of the heat transfer medium is lowered, the maintenance of the same rate of heat extraction demands an increase in the velocity of the flow through the core.

Unfortunately, the velocity of gas circulation in known pelletized fuel reactors cannot be arbitrarily raised because, in view of the direction of flow of the heat transfer medium contrary to the direction of gravity, increased velocities would result in the upper layers of pellets being carried away. Similar considerations also limit the possible increase of power in the case of alternative fuel element arrangements, for instance in the form of strings of beads suspended inside the core (that is to say, spherical fuel elements strung on a cord-like supporting material like beads). In such arrangements any increase in the velocity of flow of the heat transfer medium would, for instance, entail the risk of the fuel elements being bunched together in the upper part of the core, thus preventing replacement of the fuel elements.

It is therefore an object of the present invention to increase the power density in a high temperature reactor without expensive structural modifications and to improve the heat transfer efficiency thereof.

It is a further object of the invention to develop a high temperature nuclear reactor which contains fuel in the form of a loosely packed column of particulate and preferably nearly spherical fuel elements, and in which a coolant gas flows through the loose column of fuel elements and then transfers its heat content in heat exchangers.

These objects as well as others are achieved according to the invention by locating the fuel elements in a high temperature pelletized fuel reactor in at least one annular chamber, and in disposing the admission and conducting elements for the coolant gas in such a way that the coolant gas passes through the loose column of fuel elements in the annular chamber from the surface of the column through the annular chamber downwards, and leaves in the contrary direction of flow up the central channel within the annular chamber, which central channel is free of fuel elements. Since the central channel is in thermal contact with the annular chamber, the proposed countercurrent flow path of the coolant gas permits an excellent transfer of heat to be achieved while allowing high gas flow velocities.

The coolant gas may conveniently be arranged to enter the central channel through openings provided in the region adjacent the bottom of the annular container, whereas the admission of the coolant gas before passing through the loosely packed column of fuel is in the region of the surface of the column of fuel.

The annular chamber and its tubular core may preferably be made of a material that is a good conductor of heat, such as graphite. At least one portion adjacent its bottom is preferably conical in shape, said conical portion leading into a preferably coaxially located tube through which spent fuel elements may be discharged.

Additional objects and advantages of the present invention will become apparent upon consideration of the following description when taken in conjunction with the accompanying drawings in which.

Figure 1:
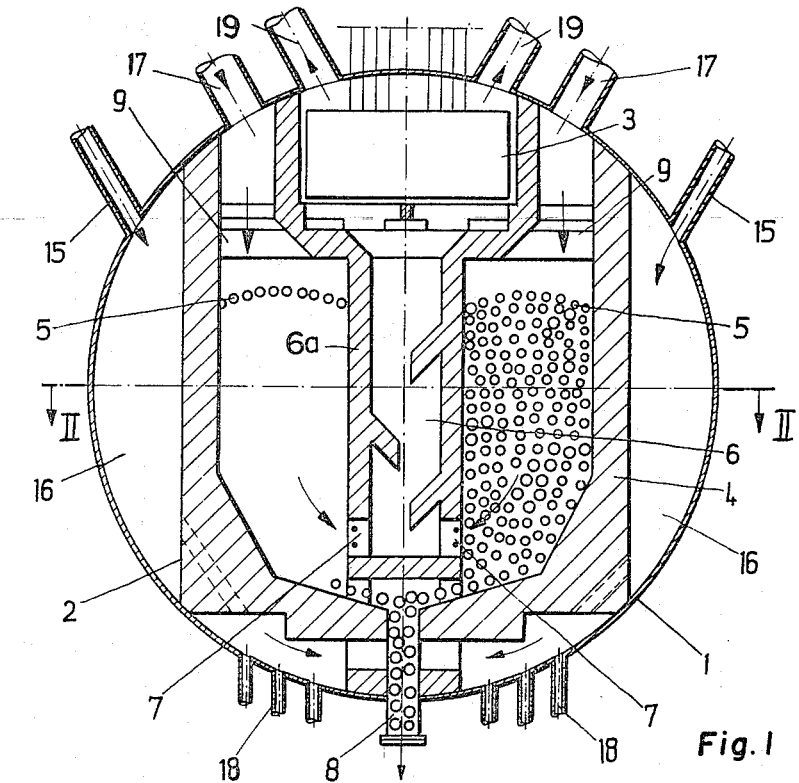
FIGURE 1 is a longitudinal sectional view of a high temperature nuclear reactor designed in the manner proposed by the present invention.

FIGURE 1 shows a spherical pressure vessel 1 enclosing a high temperature nuclear reactor 2 and a heat exchanger 3. The core of the nuclear reactor 2 is in the form of an annulus in an annular container 4 (cf. FIGURE 2) and is charged with a loose packing of spherical fuel elements 5. The annular container 4 surrounds an inner wall 6a which forms a tubular central passage 6 located substantially on the principal vertical axis of the reactor. Gas entry openings 7 at the lower end of the inner wall 6a provide communication between the annular chamber and the central passage 6. The lower part of the outer wall of the annular container 4, which is designed to form a shield, or reflector, narrows to form two conical portions of different angles of taper. A discharge tube 8 is provided substantially coaxially with the principal axis of the nuclear reactor 2 for discharging fuel elements 5 from the annular chamber 4.

Above the surface of the loose packing of fuel elements the top of the annular chamber 4 is provided with entrance ports 9 for a coolant gas entering through pipes 17. The nuclear reactor 2 is cooled and heat transfer effected by the gaseous heat transfer medium that enters through the ports 9, passing downwardly through the loosely packed fuel elements 5 and then upwardly through the tubular passage 6, in which the gases are homogeneously mixed before transferring their heat in a heat exchanger 3. In this method of conducting the coolant gas there is no danger that the upper layers of fuel elements 5 will be lifted or entrained when the flow velocity of the gas is increased.

Figure 2:
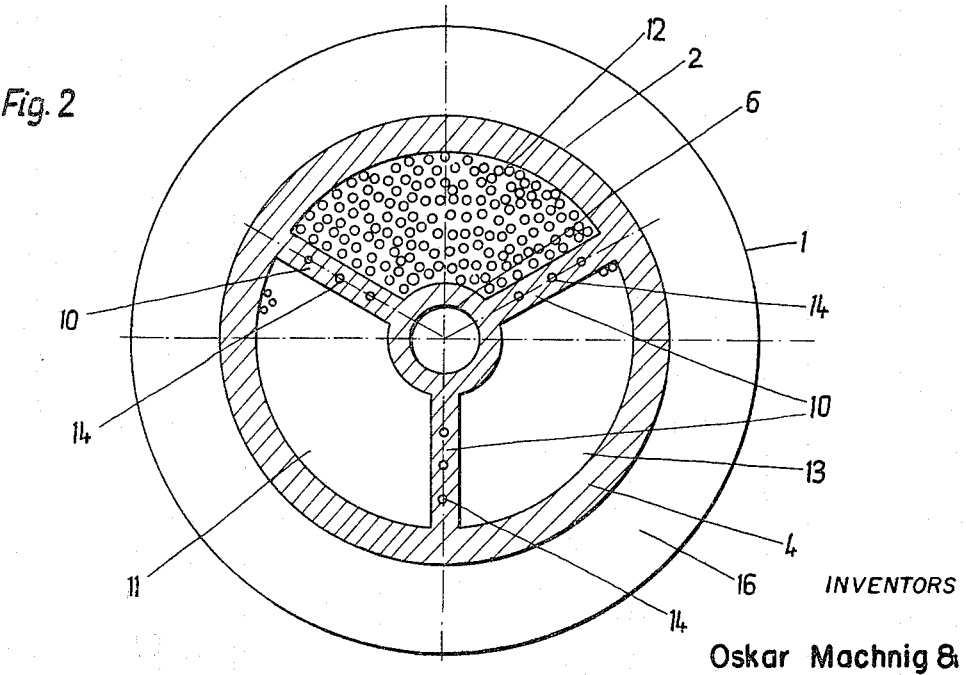
FIGURE 2 is a sectional view of the same nuclear reactor taken on the line II—II in FIGURE 1.

As will be understood from FIGURE 2, the annular container 4 is divided into three compartments 11, 12, 13, by radial partition walls 10. This arrangement permits the separate compartments to be operated in different operational states. For example, in one of the compartments 11, 12 and 13, a breeder reaction may proceed for generating fuel to replace at least some of the fuel consumed in the other compartments.

The partition walls 10, which may be made of graphite or carbon brick, contain recesses 14 for guiding at least some of the reactor's damping-down and/or control rods. This arrangement protects the control elements and provides for safe and reliable control and shut-down of the plant. At the same time, the partition walls 10 support the tubular inner wall 6a of the annular container 4.

In the embodiment illustrated in FIGURES 1 and 2, part of the coolant gas is branched off before entering the annular container 4 and is forced by pumps or fans (not shown) through pipes 15 into the outer chamber 16 formed between the annular container 4 and the pressure vessel 1. This gas stream cools the supporting structure of the annular container 4 and protects it against overheating. Moreover, the fuel elements 5 which are discharged through tube 8 are likewise cooled. The preheated coolant gas is then extracted by further pumps or fans (not shown) from the bottom of the outer chamber 16 through pipes 18 and forced through the inlets 17 and the ports 9 into the top of the annular container to pass downwardly through the fuel elements 5. The hot coolant gas leaving the heat exchanger 3 flows through exhaust pipes 19 which conduct the gas through heat exchangers in the secondary circulating system, which contains prime movers, such as steam turbines. The gas returning from the heat exchangers of the secondary system is divided into a first branch which is admitted through pipes 17 and directly flows through the fuel elements and a second branch, which forms a bypass, in which the gas is first preheated by passage through the outer chamber from pipes 15 to pipes 18, then rejoining the main stream entering through pipes 17.

Apart from providing highly efficient transfer of heat and allowing the flow velocity of the coolant gas to be raised to practically any desirable level, the nuclear reactor of the present invention has the advantage that the wall thickness of the reactor core need not be increased to achieve a higher output of power. For instance, if the capacity of the core is increased for higher over-all power, the reduction in pressure of the coolant gas necessitated by the retention of the same wall thickness can now be compensated by raising the flow velocity of the gas. Thus, the primary advantage afforded by the proposed reactor is that the required power density and the power of the blower for circulating the coolant gas are no longer limiting factors in its dimensional design for generating a prescribed over-all output of power.

As has been shown with respect to the illustrative embodiment, it may be useful to divide the annular chamber into at least two compartments by the provision of preferably radial partition walls. These partition walls should then extend between the tubular inner wall 6a of the annular chamber and its outer shell 4, which is conveniently designed as a shield or reflector. The subdivision of the annular chamber into at least two compartments permits the high temperature reactor to be optimally designed as a so-called "breeder reactor." As can be shown, the method of operation can then be such that for continuous power generation at least some of the reactor's own fuel requirements can be satisfied in the reactor itself. Another advantage of the partition is that the nuclear reactor can be conveniently operated at full or part load by the generation of critical or super-critical conditions in each of the compartments created by the partition walls. Moreover, it is within the scope of the invention to locate a fast neutron reactor in one of the compartments, if this, in itself, is desired, or in conjunction with the above-mentioned breeder reaction.

Furthermore, in the case of a high temperature nuclear reactor thus divided into compartments, individual compartments may be activated or reactivated according to the load. The partition walls should preferably be so designed that they can also function to support and brace the central channel through which the coolant gas passes in upflow. This permits the wall thickness of the central channel to be reduced without impairing its stability.

Furthermore, another useful arrangement shown in connection with the illustrative embodiment is the provision of guideways for damping-down and/or control rods for the reactor. As known, damping-down and/or control elements must be provided in the reactor and must be capable under any conditions, for instance in the event of some irregularity during operation, or in the case of major breakdowns, such as an irruption of water in the heat exchangers or temperature surges in the reactor, providing an absolutely reliable means of control or of shutting down the reactor. The partition walls are suitable for the provision of guideways for these elements because these walls must be formed of a material that is specially adapted to the conditions of reactor operation, such as graphite or carbon bricks.

Another advantageous development of the proposed high temperature nuclear reactor lies in the provision of bypass means for conducting the coolant gas in such a way that at least some of the gas is utilized for cooling the supporting structure of the annular container and/or for cooling fuel elements that are to be removed from the reactor. The coolant gas which has thus been preheated is thereafter conducted through the column of loosely packed fuel elements into the inner channel inside the central tube. Without requiring costly devices this arrangement ensures that structural parts of the high temperature nuclear reactor that are particularly exposed to thermal stress will be adequately cooled. Moreover, the coolant gas passing through this bypass is thereby already preheated before it enters the reactor core, so that a higher ultimate temperature can be obtained at the heat exchangers. Furthermore, the employment of such a system of gas circulation for also cooling fuel elements that are about to be removed reduces the fading-out time, that is to say, the time required for the fuel elements to reach a state in which they can be handled with safety, for instance for purposes of reprocessing.

Another useful feature of the present invention is the provision of a heat exchanger functioning as a superheater in the region of the outlet end of the tubular central passage. The location of the heat exchanger in the same pressure vessel as the nuclear reactor, more particularly above the core, is highly advantageous and can thus be incorporated in the present design.

According to another development of the invention the passage inside the inner wall 6a of the annular chamber can be designed to function as a mixing channel for the hot gases leaving the packed column of fuel elements. The mixing effect may be improved by the provision of various obstructions and flow-deflecting bodies, although as a rule the length of the channel as such should be sufficient to insure adequate heat interchange between the gas currents that are at different temperature levels. As known, a gaseous heat transfer medium generally selects preferential passages through loosely packed spherical pellets. Consequently, the temperature distribution in the gas leaving the column is not homogeneous; the gas tends to include a multiplicity of superheated gas streams of higher temperatures. When such a mixture of temperature components enters the central channel, a commixture of the several components ensues, so that at the upper end of the channel the temperature distribution is again quite homogeneous over the entire cross section and a uniform temperature flow through the heat exchanger adjacent the upper end of the channel results.

It is also an advantage for certain applications, to equip at least some of the compartments 11, 12 and 13 formed by the subdivision of the annular chamber with charge/discharge means of their own. As has already been mentioned, the provision of the several compartments permits the nuclear reactor to be simultaneously used as a breeder reactor and for the generation of power. By providing separate charging and/or discharging means in each compartment, these can be separately emptied or charged according to the purpose for which they are used and according to the existing neutron physical state.

It will be understood that the above description of the present invention is susceptible to various modifications, changes and adaptations, and the same are intended to be comprehended within the meaning and range of equivalents of the appended claims.

What is claimed is:

1. A high temperature nuclear reactor utilizing fuel in the form of a loosely packed column of particulate fuel elements and in which a coolant gas is conducted through the column of fuel elements and then gives up its heat in heat exchangers, said reactor comprising, in combination:
   means including an outer and an inner wall forming an annular chamber between said outer and inner walls for containing the fuel elements and a longitudinally extending hollow passage enclosed by said inner wall and free of any fuel elements; and
   means defining a gas flow path in said reactor, one section of said path extending from the top portion to the bottom portion of said annular chamber and another section of said path extending through said hollow passage, for passage of gas downwardly through the fuel elements and then upwardly through said hollow passage from the bottom portion to the top portion thereof.

2. A nuclear reactor as defined in claim 1, including at least one opening in the lower portion of said inner wall, said opening forming that portion of the flow path between said annular chamber and said hollow passage, said flow path extending downwardly in said annular chamber from about the level of the surface of the fuel elements.

3. A nuclear reactor as defined in claim 2 wherein the lower portion of said outer wall narrows interiorly to form a conical portion, and including discharge means extending substantially from the center of said conical portion for discharging fuel elements from said annular chamber.

4. A nuclear reactor as defined in claim 3, wherein said discharge means extends substantially coaxially with the principal axis defined by said reactor.

5. A nuclear reactor as defined in claim 3, including at least two partition walls extending substantially radially for dividing said annular container into sections.

6. A nuclear reactor as defined in claim 5, wherein said partition walls form supports for said inner wall.

7. A nuclear reactor as defined in claim 6, including means forming guideways within said partition walls for holding and guiding control elements for the reactor.

8. A nuclear reactor as defined in claim 6, including means forming guideways within said partition walls for holding and guiding damping-down elements for the reactor.

9. A nuclear reactor as defined in claim 5 including means for supporting said reactor, and means defining a bypass flow path extending from a point in said gas flow path in front of said one section for directing coolant gas over said supporting structure and returning said gas to said gas flow path at a point in front of said one section.

10. A nuclear reactor as defined in claim 5, including means for supporting said reactor and means defining a bypass flow path extending from a point in said gas flow path in front of said one section for directing coolant gas over fuel elements to be discharged from said annular chamber and returning said gas to said gas flow path at a point in front of said one section.

11. A nuclear reactor as defined in claim 2 including a heat exchanger for functioning as a superheater disposed in said flow path in the region of the top of said core.

12. A nuclear reactor as defined in claim 9 including a heat exchanger for functioning as a superheater disposed in said flow path in the region of, and adjacent, the top of said core.

13. A nuclear reactor as defined in claim 6, wherein the interior of said inner wall is shaped to promote mixing of the coolant gases flowing therethrough.

14. A nuclear reactor as defined in claim 6, wherein at least one of the compartments formed by said partition walls is provided with charge/discharge means for admitting fuel elements thereto and removing them therefrom.

15. A nuclear reactor as defined in claim 1 wherein said inner wall has a high thermal conductivity.

16. A method for cooling a high temperature nuclear reactor utilizing fuel in the form of a loosely packed column of particulate fuel elements and in which coolant gas is conducted through the column of fuel elements and then gives up its heat in heat exchangers, said method comprising the steps of:
   introducing coolant gas into the top region of an annular zone containing such fuel elements and directing it downwardly through the fuel elements; and
   then directing the gas upwardly through a fuel element-free central zone within the annular zone.

17. A method as defined in claim 16, including the subsequent step of extracting the heat absorbed in the reactor from said gas.

18. An arrangement as defined in claim 1 further comprising a loosely packed column of particulate fuel elements disposed entirely within said annular chamber.

References Cited by the Examiner

UNITED STATES PATENTS

| 3,034,689 | 5/1962 | Stoughton et al. | 176—59 X |
| 3,034,976 | 5/1962 | Fortescue et al. | 176—59 |
| 3,070,530 | 12/1962 | Metcalf | 176—59 X |
| 3,151,034 | 9/1964 | Douglass et al. | 176—61 X |
| 3,188,277 | 1/1965 | Kornbichler et al. | 176—59 |
| 3,203,867 | 8/1965 | Williams et al. | 176—61 |
| 3,227,620 | 1/1966 | Cutts et al. | 176—59 X |
| 3,228,852 | 1/1966 | Holmes et al. | 176—59 X |

FOREIGN PATENTS 822,461  10/1959  Great Britain.

REUBEN EPSTEIN, *Primary Examiner.*